United States Patent [19]
Yoshida et al.

[11] Patent Number: 5,630,112
[45] Date of Patent: May 13, 1997

[54] SYSTEM USING TIMING INFORMATION CONTAINED IN DATA READ FROM REPRODUCTION UNIT CONTROLLED BY FIRST OSCILLATOR TO VARY FREQUENCY OF INDEPENDENT SYSTEM CLOCK SIGNAL

[75] Inventors: Takuji Yoshida, Yokohama; Takayuki Uchida, Kumagaya, both of Japan

[73] Assignee: Kabushiki Kaisha Toshiba, Kawasaki, Japan

[21] Appl. No.: 301,266

[22] Filed: Sep. 6, 1994

Related U.S. Application Data

[63] Continuation of Ser. No. 969,315, filed as PCT/JP92/00766 Jun. 16, 1992, abandoned.

[30] Foreign Application Priority Data

Jun. 19, 1991 [JP] Japan .................................. 3-146426
Jun. 19, 1991 [JP] Japan .................................. 3-146431

[51] Int. Cl.$^6$ ............................................. G06F 13/42
[52] U.S. Cl. ................... 395/556; 395/878; 395/881
[58] Field of Search ....................... 84/601, 605, 648, 84/671, 672, 673, 674, 675; 395/250; 370/102, 108; 375/372

[56] References Cited

U.S. PATENT DOCUMENTS

| | | | |
|---|---|---|---|
| 3,894,463 | 7/1975 | Rocheleau | 84/1.01 |
| 4,001,690 | 1/1977 | Mack et al. | 455/13.2 |
| 4,181,975 | 1/1980 | Jenkins | 395/550 |
| 4,562,488 | 12/1985 | Koyama et al. | 360/8 |
| 4,733,385 | 3/1988 | Henmi et al. | 360/8 |
| 4,772,959 | 9/1988 | Amano et al. | 360/8 |
| 4,803,726 | 2/1989 | Levine et al. | 380/48 |
| 4,823,207 | 4/1989 | Kobayashi et al. | 360/8 |
| 4,964,109 | 10/1990 | Yoshioka | 369/44.1 |
| 5,166,804 | 11/1992 | Takahashi | 358/341 |
| 5,280,394 | 1/1994 | Murabayashi et al. | 360/8 |
| 5,323,426 | 6/1994 | James et al. | 375/118 |
| 5,327,581 | 7/1994 | Goldberg | 455/51.2 |
| 5,331,641 | 7/1994 | Parruck et al. | 370/102 |
| 5,367,545 | 11/1994 | Yamashita et al. | 375/118 |
| 5,402,452 | 3/1995 | Powell et al. | 375/372 |

FOREIGN PATENT DOCUMENTS

| | | |
|---|---|---|
| 60-211558 | 10/1985 | Japan . |
| 1-130223 | 5/1989 | Japan . |
| 2-62762 | 3/1990 | Japan . |

*Primary Examiner*—Thomas C. Lee
*Assistant Examiner*—Sang Y. Nahm
*Attorney, Agent, or Firm*—Cushman Darby & Cushman, IP Group of Pillsbury Madison & Sutro, LLP

[57] ABSTRACT

The present invention relates to a digital data processing apparatus for transferring digital data which is output from a disc reproduction section ($15_1$) to a buffer memory (18)-equipped host processing section (13) and for making processing. By detecting a shift in frequency of an operation clock on the basis of an output of the disc reproduction section ($15_1$) and varying the frequency of the operation clock of the host processing section (13) in accordance with a result of that detection, it is possible to prevent the memory (18) from being placed in an over- or an underflowed state and to perform a normal data reproduction.

12 Claims, 7 Drawing Sheets

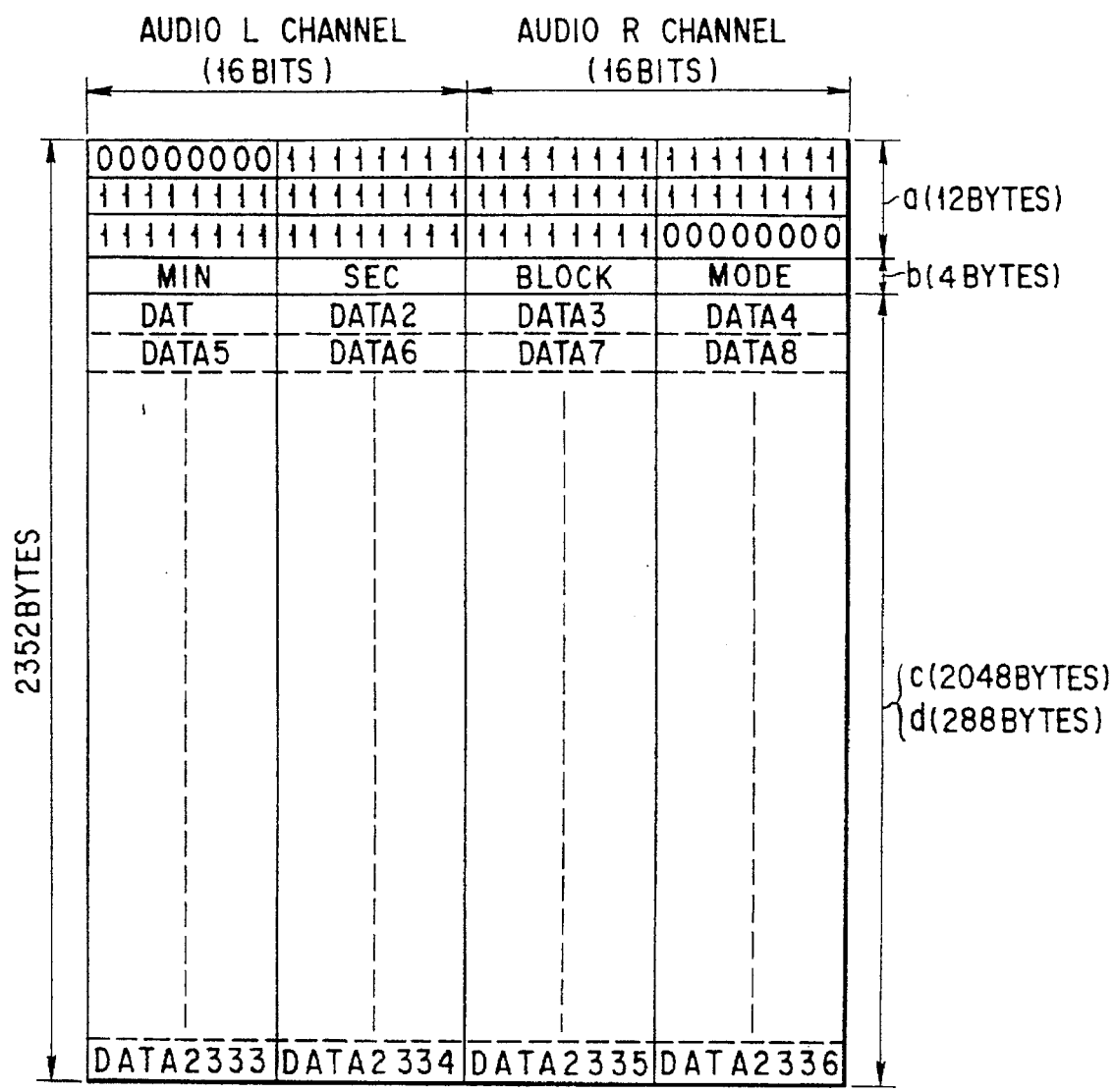
F I G. 1

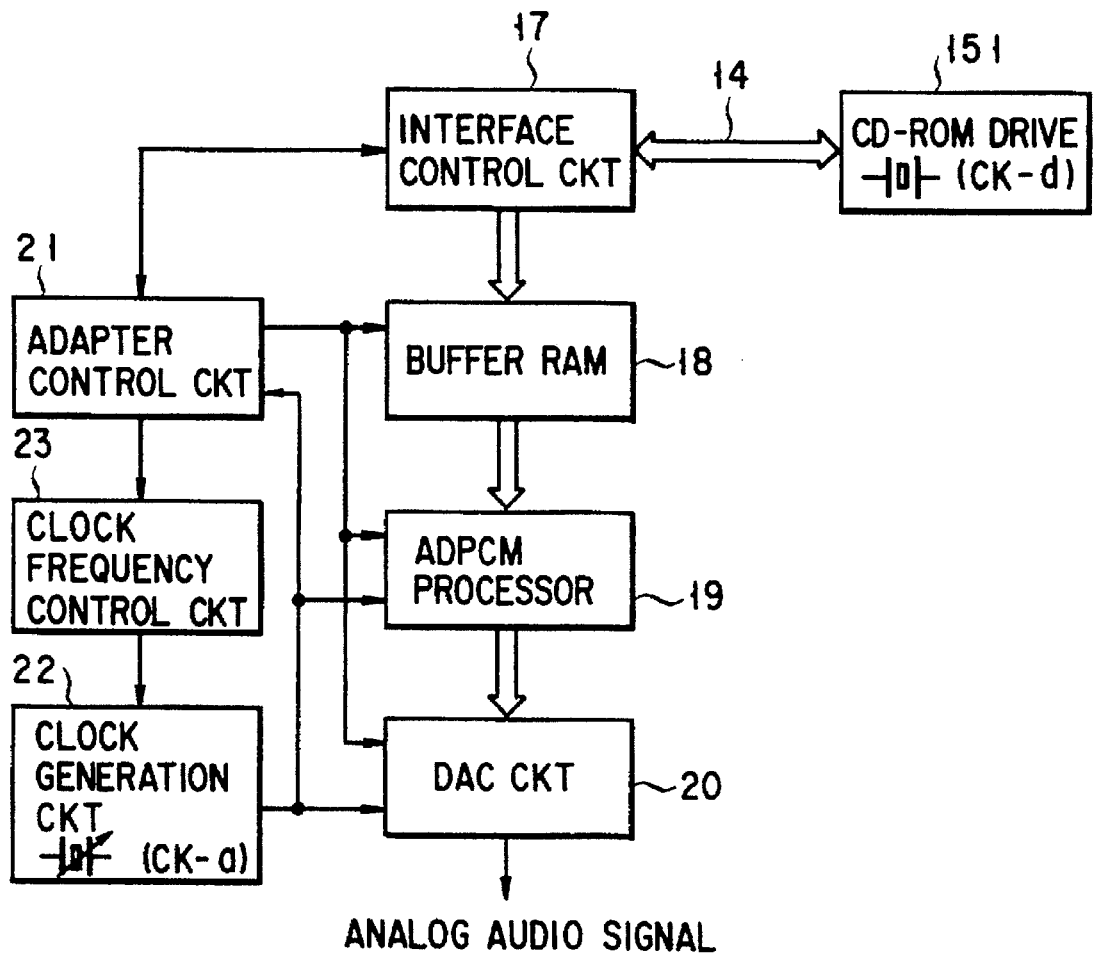
F I G. 4

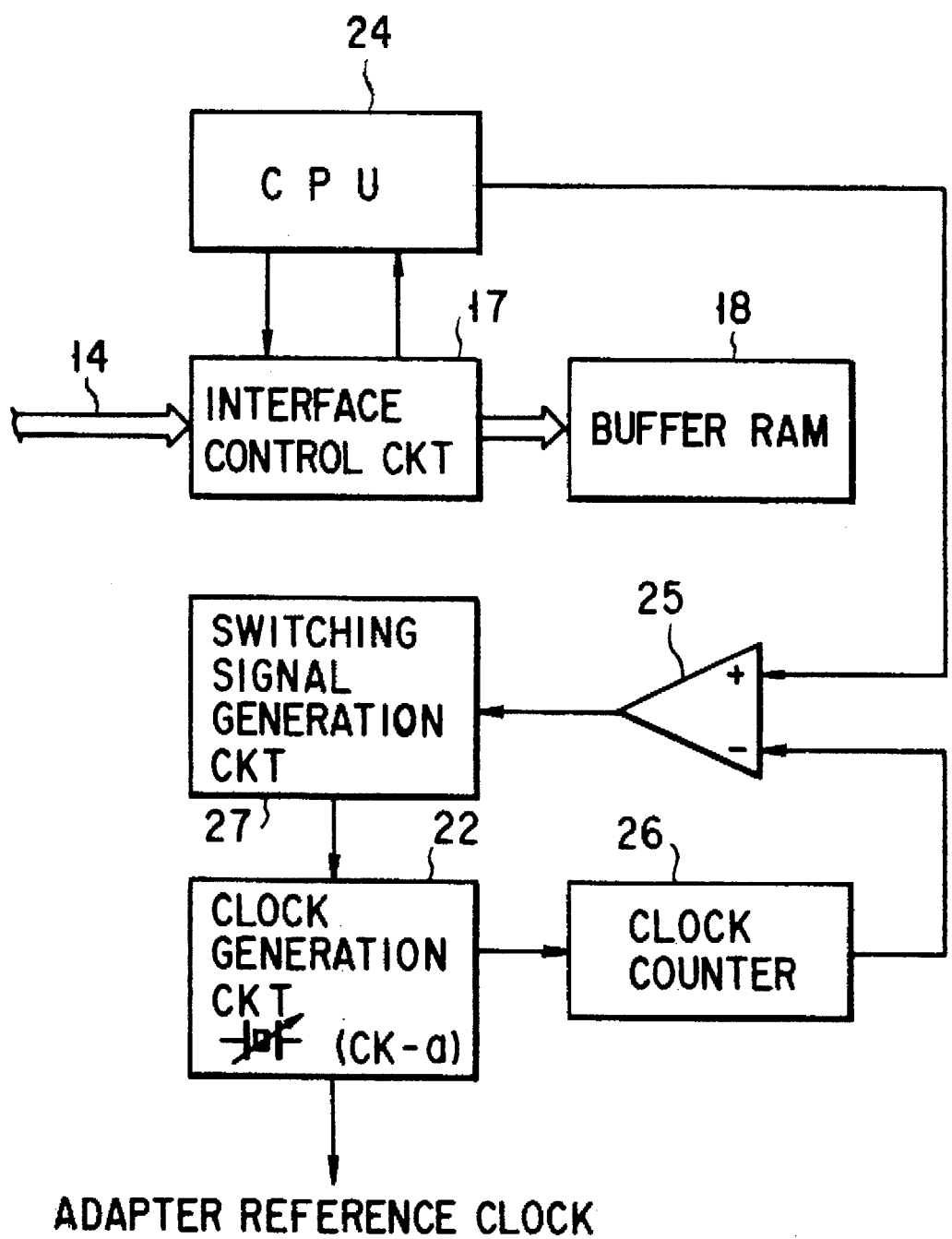
F I G. 7

SYSTEM USING TIMING INFORMATION CONTAINED IN DATA READ FROM REPRODUCTION UNIT CONTROLLED BY FIRST OSCILLATOR TO VARY FREQUENCY OF INDEPENDENT SYSTEM CLOCK SIGNAL

This is a continuation of application Ser. No. 07/969,315, filed as PCT/JP92/00766 Jun. 16, 1992, which was abandoned upon the filing hereof.

TECHNICAL FIELD

The present invention relates to a digital data processing apparatus for transferring digital data which is output from a disc reproduction section to a host processing section and making processing and, in particular, an apparatus for securing synchronization between the data reproduction speed of the disc reproduction section and the data processing speed of the host processing section.

BACKGROUND ART

As known in the art, the CD (compact disc) system currently employed as a main-current acoustic apparatus is of such a type that pits are formed in a 12 cm-diameter disc in a manner to correspond to digital PCM (pulse code modulation) data and reproduction is performed by, while rotating the disc in a drive rotation in a CLV (constant linear velocity) system, linearly tracking the data from an inner periphery side to an outer periphery side on the disc by a semiconductor laser and an optical pickup built in a photoelectric conversion element.

Audio playback musical tone data and sub-code data P, Q, R to W defined for control/display are recorded in the disc. Of the aforementioned data, the sub-code Q is also called as address data and represents, in a program area containing disc's musical tone data, a program number (TNO) of recorded musical tone data, a phrase number (INDEX), a lapse time (TIME) for each program, a total time (ATIME) lapsing from a start position of the program area, etc.

Further, the aforementioned sub-code data Q represents, in a lead-in area located on the inner periphery side of the program area, a start address of each program as TOC (table of contents) data. That is, the sub-code data Q is recorded for implementing a search operation, accurately at high speeds, for selective reproduction of playback data from vast information recorded in the disc to enable a stereo reproduction to be performed for about one hour and grasping the state of a reproduction on the disc.

The CD system has initially been developed so as to record and reproduce musical data. In recent years, with attention paid to such a vast recording capacity, a CD-ROM (read only memory) system is determined to be used as a read-only data recording medium for the disc through the use of a musical data recording area of the disc as a digital information recording area. The CD-ROM system is of such a type as to record and reproduce digital information on the disc without varying a recording/reproduction format for musical data reproduction in the CD system and to do so by adding a new format thereto.

In the existing digital data processing system using a CD-ROM system, however, when there occurs a shift in frequency of a clock serving as a reference of a data processing speed relative to a host processing section side and disc reproduction section side, the buffer memory at the host processing section side is placed in an over- or an underflowed state, failing to make a normal data reproduction and thus presenting a problem.

The present invention is achieved, taking the above situations into consideration and the object of the present invention is to provide a much better digital data processing apparatus which, even when there occurs a shift in frequency of a clock serving as a reference of a data processing speed relative to a host processing section side and disc reproduction section side, can prevent a buffer memory on the host processing section side from being placed in an over- or an underflowed state and make a normal data reproduction.

DISCLOSURE OF INVENTION

That is, a digital data processing apparatus of the present invention comprises:

a disc reproduction section for making a reproduction, based on a first clock, on a digital data recorded disc;

a host processing section having a memory for storing the digital data output from the disc reproduction section on the basis of the first clock and reading out the digital data from the memory on the basis of a second clock to perform predetermined processing; and control means for detecting a shift in frequency of the first clock on the basis of an output of the disc reproduction section and varying a frequency of the second clock in accordance with a result of that detection.

That is, even when there occurs a shift in frequency of the first clock on the disc reproduction section side, there occurs a corresponding variation in frequency of the second clock on the host processing section side. It is, therefore, possible to prevent the memory from being placed in an over- or an underflowed state and to perform a normal data reproduction. Further, since the data output from the disc reproduction section is utilized to detect a shift in frequency of the first clock, it is not necessary to provide any dedicated synchronizing signal line so as to make the second clock on the host processing section side synchronize with the first clock on the disc reproduction section side. This arrangement is advantageous.

BRIEF DESCRIPTION OF DRAWINGS

FIG. 1 is a view showing a data format under a CD-ROM system;

FIG. 4 is a block diagram showing a digital data processing apparatus according to one embodiment of the present invention;

FIG. 7 is a block diagram showing another embodiment of the present invention.

BEST MODE OF CARRYING OUT THE INVENTION

Hereinafter, one embodiment of the present invention will be explained in more detail below with reference to the accompanying drawings. In a CD system, two-channel analog musical tone signals are sampled with 44.1 kHz and recorded as 16-bit digital musical tone data. In a CD-ROM system, on the other hand, the 16 bits are divided into 8 bits (one byte) as shown in FIG. 1 and digital data is recorded with 2352 bytes as one unit (one block).

As shown in FIG. 1, one block comprises a 12-byte synchronizing pattern a for recognizing a start of the block, a 4-byte header address b showing address information of the block corresponding to the sub-code data Q, a 2048-byte (=2 k bytes) user data c for a user and a 288-byte error correction data d for error detection and correction of the user data.

Of these, the error correction data d is used in the case where an error was able to be corrected only through C1, C2 parity corrections in a recording/reproduction format of the CD system. The use of the error correction data d improves an error rate up to $10^{-12}$. Viewed from the error rate, the CD-ROM system can have, in practice, an adequate performance as a data recording medium for the computer.

It is to be noted that the aforementioned one block configuration is a format called as a MODE-1. There is, in addition, another format called a MODE-2 for recording the user data c even in a recording area of the error correction data. In the format of the MODE-2, the user data c is 2336 bytes.

Here, a data transfer rate in the CD-ROM system is 75 blocks/sec. and, in the case where one-hour data recording is carried out with the MODE-1 format, data $$75 \text{ (block/sec.)} \times 60 \text{ (minute)} \times 60 \text{ (second)} \times 2 \text{ (k byte)} = 540 \text{ M bytes}$$

will be recorded. This amount of data corresponds to 500 sheets of ordinary floppy discs and, in the form of a document, to about 300000 pages.

Further, the CD-ROM system is excellent even in its replica capacity. That is, the CD-ROM system is such that the process of manufacturing its disc is the same as the process of manufacturing the existing CD system's disc and that the manufacturing cost of the CD-ROM system's disc per 1M bytes is far lower than the manufacturing cost of the floppy disc per 1M bytes. This is very suited to the duplication of the same document and data.

In the existing recording/reproduction system using the disc, the CD-ROM system achieves a recording/ reproduction system which has a large storage capacity and allows a readier duplication at a low error rate.

Figure 2:
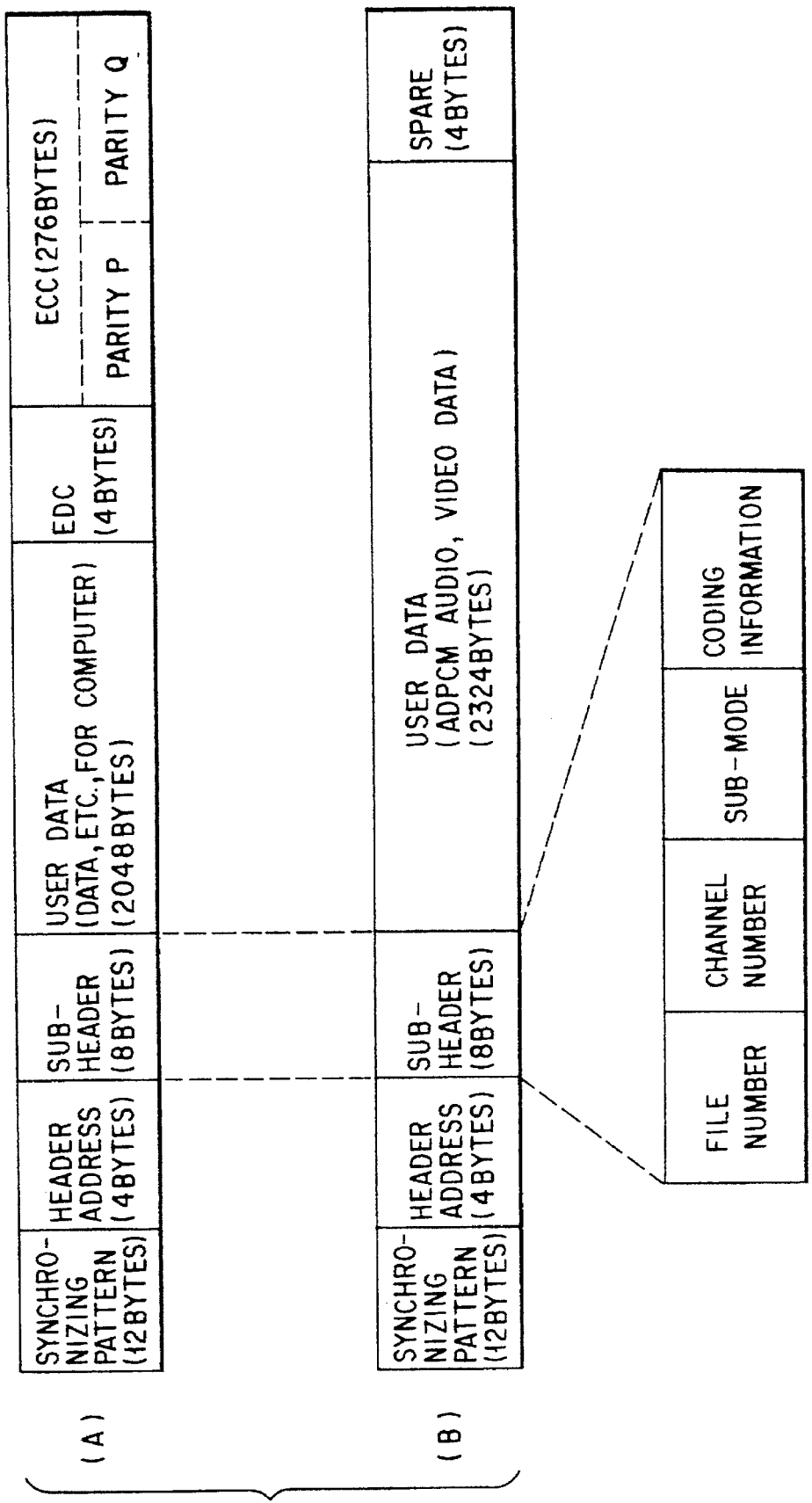
FIG. 2 is a view showing a data format under a CD-ROM-XA standard.

In recent times, a CD-ROM·XA (extended architecture) standard has been announced as a CD-ROM system's expansion standard. This CD-ROM·XA standard defines a format on video data and compressed audio data (ADPCM system) recorded in the disc. That is, the data under the CD-ROM·XA standard is recorded in the block of the aforementioned MODE-2 format and it specifies two forms as shown in FIGS. 2A and 2B.

Audio data is recorded, with an ADPCM system, in an interleaved relation. A level B of 37.8 kHz and level C of 18.9 kHz are defined for a sampling frequency 44.1 kHz under the CD system and the compression ratio is 4-fold at the level B (stereo) time and 16-fold at the level c (monaural) time. In the case of the monaural audio data, therefore, it is possible to record the 16-hour long data in a single disc.

Further, the use of the file number and channel number defined in the sub-header enables recording to be made in a complex-interleaved fashion, for example, a Japanese language and English narration to be recorded in channels 1 and 2, respectively, in which case these can be reproduced through momentary switching. It is also possible to record the audio/video data in an interleaved relation. It is possible to record the video data and audio data in the channels 1 and 2, respectively, and to reproduce the audio data while, on the other hand, reading the video data.

In the CD-ROM system, the video data and audio data are recorded on a data track and audio track, respectively, on the disc and video/audio synchronization is achieved by repeatedly gaining access to both the data. In the CD-ROM·XA standard, on the other hand, it is possible to effect switching between a plurality of languages and simultaneous image display, in real time, without involving any access operation. As already set out above, it is possible to record a long-hour duration audio data, though being somewhat degenerated in tonal quality, one great advantage of the CD-ROM·XA standard.

Here, a DAC (digital-to-analog converter) is incorporated into the CD-ROM drive for making a reproduction on the CD-ROM system disc and the audio data on the CD system disc is subjected, by a command of the host PC (personal computer), to processing in the CD-ROM drive, enabling a resultant signal to be converted to an analog audio signal for an audio performance to be carried out.

Figure 3:
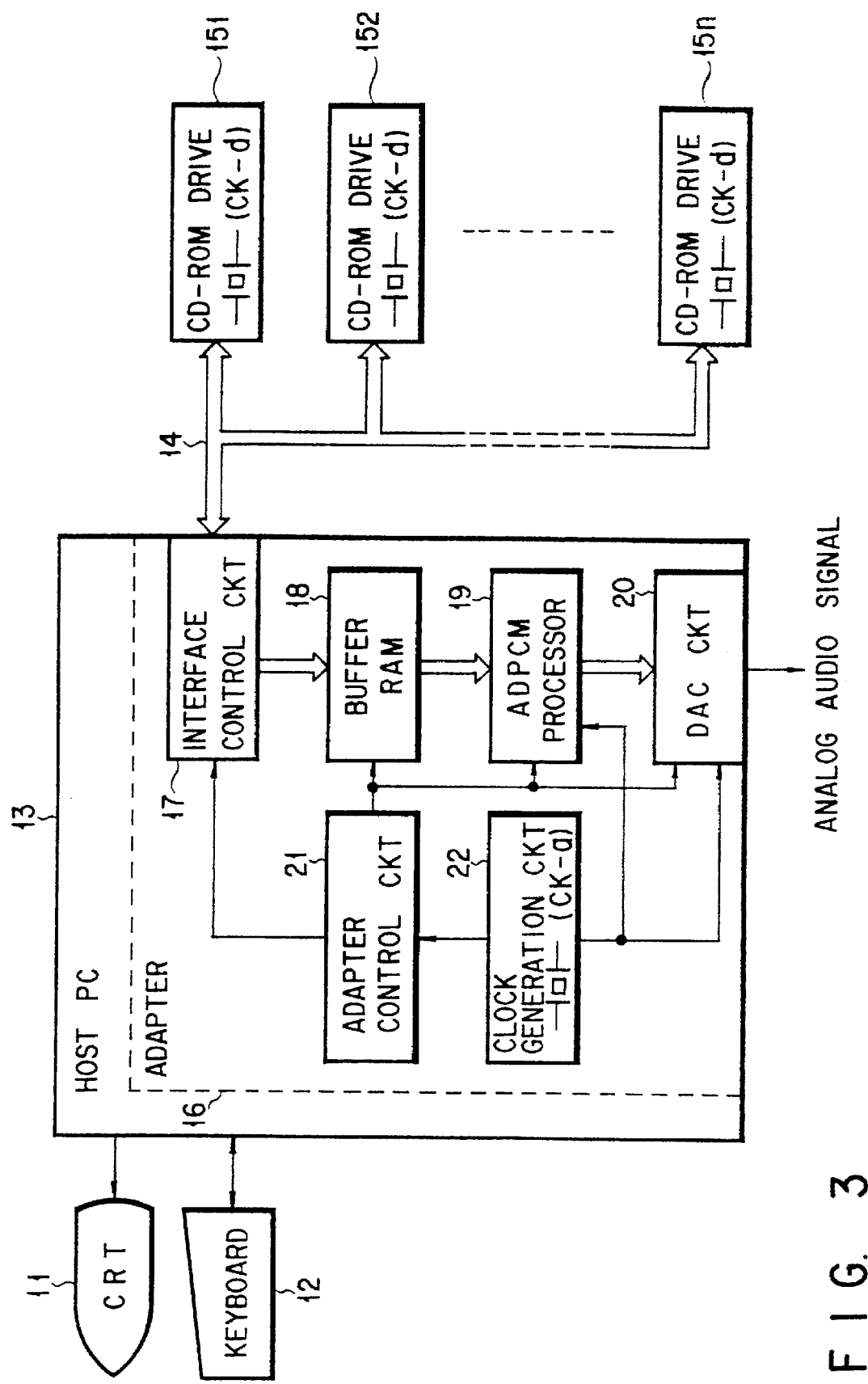
FIG. 3 is a block diagram showing a digital data processing system to which the present invention is applied.

At the present time, a digital data processing system is considered according to which, as shown in FIG. 3, a plurality of CD-ROM drives $15_1$, $15_2$, . . . , $15_n$ are connected, via for example an interface 14 such as an SCSI (small computer system interface) bus, to host computer PC 13 to which a CRT (cathode ray tube) 11 for display and operation key board are connected and the audio data selectively obtained from the respective CD-ROM drives $15_1$, $15_2$, . . . , $15_n$ prior to being converted to a digital one by a DAC circuit is transferred via the interface 14 to the host PC 13 where it is subjected to processing by an adapter 16 to convert a resultant signal to an analog audio signal for an audio performance to be carried out.

In this case, the adapter 16 comprises an interface control circuit 17 for controlling the aforementioned interface 14, a buffer RAM (random access memory) 18 for temporarily storing digital audio data output from the interface control circuit 17, an ADPCM processor 19 for subjecting audio data which is read out from the buffer RAM 18 to expansion processing in the case of the CD-ROM·XA standard, a DAC circuit 20 for converting the audio data which is output from the ADPCM processor 19 to an analog audio signal, an adapter control circuit 21 for controlling a series of operations of the aforementioned interface control circuit 17, buffer RAM 18, ADPRM processor 19 and DAC circuit 20, and a clock generation circuit 22 for generating a clock necessary for, and supply it to, the adapter control circuit 21, ADPCM processor 19 and DAC circuit 20.

According to the aforementioned digital data processing system, it is not necessary to provide any DAC circuit in the respective CD-ROM drives $15_1$, $15_2$, . . . , $15_n$ and, therefore, an inexpensive CD-ROM drive can be used with the DAC circuit eliminated. As a means for achieving the CD-ROM·XA standard, two systems are considered, one incorporating a demodulation circuit into the CD-ROM drive and the other subjecting data which is transferred from the CD-ROM drive via the interface to proceeding in which case an adapter is provided in the host PC. For the time being, it is predicted that the latter system is toward a main current of the art.

If the adapter is so designed as to, in addition to a demodulation circuit for the CD-ROM·XA standard, have an audio data transfer circuit, an effective system can be structured in a simpler and more neat configuration. Further, a plurality of CD-ROM drives can be connected to an ordinary interface. In this case, it is only necessary to provide a single demodulation circuit, a great advantage of an adapter type one.

In the CD system, the sampling frequency is 44.1 kHz and, commonly, this frequency is generated through the frequency division of 16.9344 MHz, that is, 16.9344 MHz×(¼)×(⅓)×(1/32)=44.1 kHz. Normally, the CD-ROM drive contains a 16.9344 MHz-crystal oscillator and frequency divider circuit.

Even in the digital data processing system shown in FIG. 3, it is required that a similar circuit be provided in the adapter 16. This is because demodulation processing in the adapter 16 is implemented with the aforementioned same sampling frequency 44.1 kHz. This is the requisite principle in the reproduction of data not only on the CD-ROM system disc and but also under the CD-ROM·XA standard.

In the digital data processing system shown in FIG. 3, the commonest arrangement for the clock is to provide a separate, individual constant-frequency crystal oscillator between the adapter 16 and the respective CD-ROM drives $15_1, 15_2, \ldots, 15_n$. In this case, in order to obtain the same sampling frequency between the adapter 16 and the respective CD-ROM drives $15_1, 15_2, \ldots, 15_n$, a crystal oscillator is naturally employed which has the same nominal frequency.

However, there is no possibility that both the oscillation frequencies will completely coincide with each other at all times. This is because the oscillation frequency varies depending upon the accuracy, aging, ambient temperature, etc., of the crystal oscillator. According to the specification of an ordinary crystal oscillator, for example, with the allowable frequency deviation of within ±20 ppm/25° C.±3° C., the frequency temperature deviation becomes within ±30 ppm/−20° C. to 60° C. Both the deviations, if being simply added together, become ±50 ppm (±0.005%). Even if the crystal oscillator of the aforementioned specification is adopted in the CD-ROM drive and adapter, the maximum frequency deviation occurring therebetween becomes 50×2= 100 ppm (0.01%).

Stated in connection with the digital data processing system shown in FIG. 3, when for example, audio data is processed, the whole system of the CD-ROM drives $15_1, 15_2, \ldots,$ or $15_n$ is operated based on the reference clock CK-d generated therein and, with that frequency, audio data is reproduced from the disc. The reproduced audio data is supplied via the interface 14 and then interface control circuit 16 to the buffer RAM 18 where it is temporarily stored. Therefore, the audio data stored in the buffer RAM 18 is sequentially read out of the buffer RAM 18 on the basis of an adapter reference clock CK-a generated at the clock generation circuit 22 and is converted by the DAC circuit 20 to an analog audio signal.

Here, if the frequencies of the two clocks CK-d and CK-a are exactly equal to each other, then the input of the audio data into the buffer RAM 18 in the adapter 16 and output of the audio data out of the buffer RAM 18 are processed with exactly the same speed and, therefore, no audio data is basically stored in the buffer RAM 18, and a continuous audio performance is done without presenting any problem.

In the case where the reference clock CK-d of the CD-ROM drive $15_1, 15_2, \ldots, 15_n$ is +0.005% shifted and adapter reference clock CK-a generated at the clock generation circuit 22 is −0.005% shifted, the speed with which the audio data is input to the buffer RAM 18 is 0.01% faster than the speed with which the audio data is output out of the buffer RAM 18. Therefore, unprocessed audio data is little by little stored in the buffer RAM 18.

That is, since the rate at which the audio data is reproduced in the CD-ROM system is 176400 bytes/sec., the audio data is stored in the buffer RAM 18 at a rate of 17.64 bytes per second and the audio data of 17.64×120 seconds= 2117 bytes is stored after two minutes. Since, therefore, a 2 k-byte (2048 bytes) element is adopted as the buffer RAM 18, the buffer RAM 18 is placed in an overflowed state after 2 minutes, that is, in a state in which there is no area in which new audio data is written.

In order to cope with this situation, it is considered probable to provide an overwriting means for overwriting newly reproduced audio data over unprocessed audio data written into the buffer RAM 18 and means for discarding newly reproduced audio data without being written into the buffer RAM 18 and continuing processing unprocessed audio data. In either case, however, the audio data is dropped out. The order of the reproduction varies erroneously for the former case and the reproduced audio tone is skipped for the latter case. It is, therefore, not possible in either means to make any continuous, uninterrupted audio performance.

In the case where, on the other hand, the reference clock CK-d of the CD-ROM drive $15_1, 15_2, \ldots, 15_n$ is −0.005% shifted and adapter reference clock CK-a generated at the clock generation circuit 22 is +0.005% shifted, then the speed with which the audio data is output out of the buffer RAM 18 is 0.01% faster than the speed with which the audio data is input to the buffer RAM 18. Therefore, the buffer RAM 18 is placed in an underflowed state. Even if the audio data is be read out of the buffer RAM 18 on the basis of the adapter reference clock CK-a, the buffer RAM 18 is placed in a state where there is no audio data at all. It is not possible to make any normal audio performance.

Since the aforementioned two cases are determined due to the ambient temperature, etc., it is not possible to initially predict, in practice, which state occurs or to cope with it. As a means for solving the aforementioned problem it may be considered probable to provide a dedicated synchronizing signal line between the respective CD-ROM drives $15_1, 15_2, \ldots, 15_n$ and the adapter 16 so that operation synchronization is achieved between both. Adding a specific line to a standard interface connector is not desirable from the standpoint of its general application and economy.

According to the present invention, as will be set out below, the buffer RAM 18 is prevented from being placed in an over- or an underflowed state. As will be explained below with the same reference numerals added to parts in FIG. 4 corresponding to those shown in FIG. 3, a clock generation circuit 22 allows the frequency of the adapter reference clock CK-a which is output to be varied based on the output of a clock frequency control circuit 23. It may be considered possible in the clock generation circuit 22 to, for example, employ a VCO (voltage controlled oscillator), or a system for making switching between those different bargaining frequency outputs of a plurality of crystal oscillators or their frequency-divided outputs, as a means for making the adapter reference clock CK-a frequency variable.

As will be set out in more detail below, the clock frequency control circuit 23 is controlled by the output of an adapter control circuit 21 and the adapter control circuit 21 is driven by the adapter reference clock CK-a output from the clock generation circuit 22.

Here, in the CD-ROM·XA standard, as set out below, a block is defined as a data reproduction unit and one block is comprised of 2352 bytes. A data unit normally processed by the interface 14 is also the same as that block and, under an SCSI standard for example, addressing (hereinafter referred to as a block address) is adopted with this block as one unit address.

In an arrangement shown in FIG. 4, when the CD-ROM·XA standard data is to be reproduced, a data reproduction command is transferred from the host PC 13 to a CD-ROM drive $15_1$ (the other CD-ROM drives $15_2$ to $15_n$ are omitted in FIG. 1). At that time, the block address is employed as a parameter whereby a data reproduction start address, data reproduction length, etc., are designated.

The CD-ROM drive $15_1$ retrieves desired data from the disc on the basis of the command for reproduction and reproduced data is transferred to the host PC 13. At this time, the transfer of the data is managed with the aforementioned block size. The data transferred to the host PC 13 is sent via an interface control circuit 17 to a buffer RAM 18 where it is once stored. The data is supplied via an ADPRM processor 19 to a DAC circuit 20 to convert it to an analog audio signal.

Even in the case where the audio data obtained upon reproduction on the ordinary CD system disc is transferred to the host PC 13 and, by so doing, an audio performance is executed, the basic data processing procedure is entirely the same as set out above. It is to be noted that, for such audio data, there is no such a block concept as defined under the CD-ROM system and CD-ROM·XA standard. This is because, in the CD system, an audio performance is carried out by converting the audio data to an analog one without any break.

Although, in the CD system, the sub-code Q data is set for address management, since the address indicated by the sub-code Q data exactly does not correspond to actual audio data, it is not possible to simply divide an audio data series on the basis of the sub-code Q data.

In order to transfer the audio data of the CD system, it is necessary to define one block size and addressing of the audio data, because data transfer is implemented, between the host PC 13 and the CD-ROM drive $15_1$, with the use of these parameters.

The most convenient definition as the block of the audio data is to adopt the same block size (2352 bytes) as that under the CD-ROM system and CD-ROM·XA standard. Since the block size corresponds to one frame of the sub-code Q data, one-to-one addressing is basically possible and the same data transfer rate is involved in all the transfer modes under the CD system, CD-ROM system and CD-ROM·XA standard (2352 bytes/block). It is possible to advantageously obtain readier data management in the adapter 16.

The clock frequency control circuit 23 knows a shift of the reference clock CK-d from the cycle of a synchronizing pattern a in the data block and controls the frequency of the adapter reference clock CK-a from the clock generation circuit 22 so as to secure synchronization, based thereon, between the speed with which the data is input to the buffer RAM 18 and the speed with the data is read from the buffer RAM 18.

Figure 5:
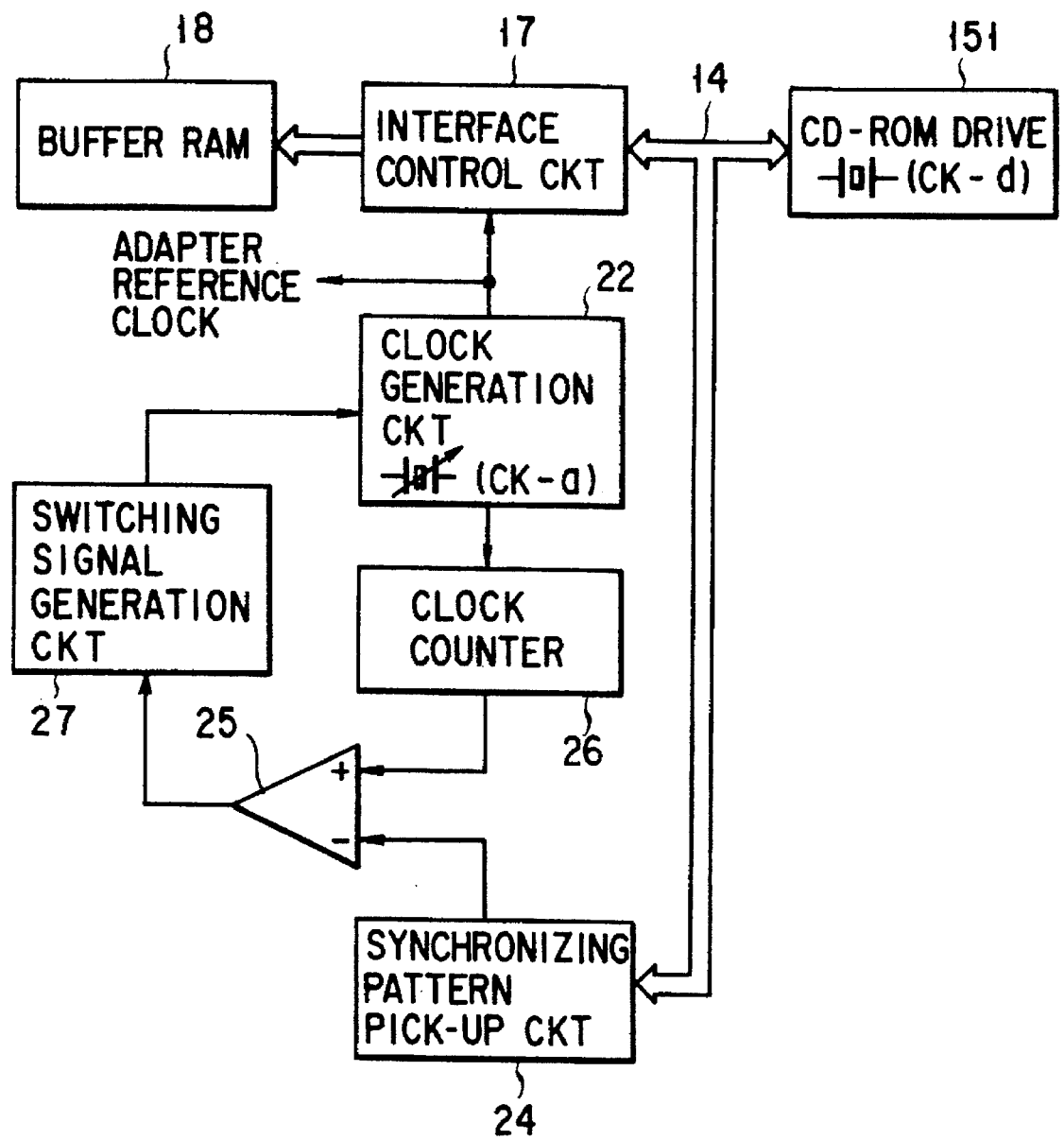
FIG. 5 is a block diagram showing a detail of a main section of the embodiment shown.

Stated in more detail, as shown in FIG. 5, audio data output from the CD-ROM drive $15_1$ is supplied to an interface control circuit 17 and a synchronizing pattern pick-up circuit 24. The synchronizing pattern pick-up circuit 24 detects, from the input audio data, the aforementioned synchronizing pattern a in the respective block and enables a timing pulse to be generated at a negative input terminal of a comparator.

On the other hand, the adapter reference clock CK-a which is output from a clock generation circuit 22 is counted by a clock counter 26. When the clock counter 26 counts the adapter reference clock CK-a corresponding to one block (2352 bytes), it has its count value reset and again starts a cogent operation and enables a timing pulse to be generated at a positive input terminal + of the comparator 25. That is, from the clock counter 26 a timing signal is generated at a cycle corresponding to the block.

The comparator 25 makes a comparison as to, of the timing pulse generated from the synchronizing pattern pick-up circuit 24 and timing pulse generated from the clock counter 26, which is more fastly input thereto, and outputs a comparison signal corresponding to their time difference to a switching signal generation circuit 27.

In order to simultaneously generate both the timing pulse from the pick-up circuit 24 and the timing pulse from the clock counter 26, the switching signal generation circuit 27 generates, based on a comparison signal, a switching signal for switching those outputs of a plurality of different bargaining frequency crystal oscillators in the clock generation circuit 22 or those frequency division ratio and delivers it as an output to the clock generation circuit so that the frequency of the adapter reference CK-a clock from the clock generation circuit 22 is controlled.

According to the aforementioned embodiment, therefore, even if there occurs a shift in frequency of the reference clock CK-d on the CD-ROM drive $15_1$ side, there occurs a corresponding variation in frequency of the adapter reference clock CK-a on the host PC 13 side and it is possible to prevent the buffer RAM 18 from being placed in an over- or an underflowed state, thus ensuring a normal data reproduction.

Further, from the data output from the CD-ROM drive $15_1$ a synchronizing pattern a in each block is detected so that it is utilized for the detection of one block period. Therefore, it is not necessary to provide any dedicated synchronizing signal line for making the adapter reference clock CK-a on the host PC 13 side synchronize with the reference clock CK-d on the CD-ROM drive side. This arrangement is advantageous.

Figure 6:
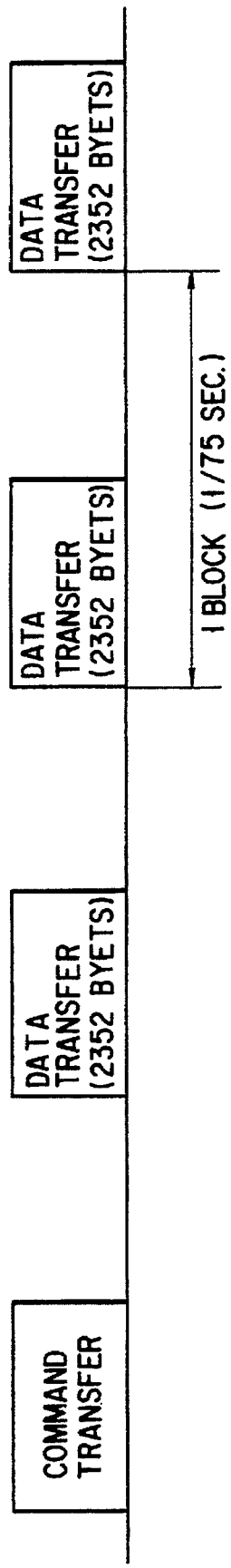
FIG. 6 is a timing diagram for explaining a data transfer in the embodiment shown.

With the block size of the CD system's audio data as 2352 bytes, the data transfer timing in the case of using the same block size even under the CD-ROM·XA standard is as shown in FIG. 6. That is, the data transfer leaves some spacing between the respective transfer blocks and is done in an intermittent fashion. The reason is that the output data rate from the CD-ROM drive $15_1$ is as slow as 2352×72= 176400 bytes/sec. while, on the other hand, the rate at the interface 14 is very fast, for example, 4M bytes/sec.

Here, the reproduction rate of the respective block (2352 bytes) is defined as 75 block/sec. That is, the respective block is transferred with a 1/75 second cycle, but this cycle is naturally controlled with the reference clock CK-d in the CD-ROM drive $15_1$. That is, the data block transfer cycle in the interface 14 is synchronized with the reference clock CK-d in the CD-ROM drive $15_1$ and, by measuring this, it is possible to know a shift in the reference clock CK-d of the CD-ROM drive $15_1$.

The aforementioned clock frequency control circuit 23 may control the frequency of the adapter reference clock CK-a from the clock generation circuit 22 by knowing a shift of the reference clock CK-d from the data block transfer cycle and making, based thereon, the speed of a data input to the buffer RAM 18 synchronize with the speed with which the data is read out of the buffer RAM 18.

Stated in more detail, as shown in FIG. 7, the interface control circuit 17 is controlled by a CPU (control processing unit) 24 and the timing of the transfer of a command and reception of reproduction data is generated by CPU 24. That is, upon data transfer from the CD-ROM drive $15_1$ to the host PC, a readout request signal which is sent in a way to correspond to the head position of each block is detected by CPU 24 via the interface control circuit 17 to perform predetermined processing. By so doing, the data transfer is carried out.

CPU 24, upon detecting a readout request signal of the data block output from the CD-ROM drive $15_1$, allows an interface control circuit 17 to start its data reception and a timing pulse to be generated at a positive input terminal + of a comparator 25.

On the other hand, the adapter reference clock CK-a output from a clock generation circuit 22 is counted by a clock counter 26. The clock counter 26, upon counting the adapter reference clock CK-a by one block (corresponding to 2352), has its count value automatically reset and again start a count operation. At this same time, a timing pulse is generated at a negative input terminal − of the comparator 25.

The aforementioned comparator 25 detects which of a timing pulse from CPU 24 and timing pulse from the clock counter 26 is faster input and outputs a comparison signal corresponding to their time difference to a switching signal generation circuit 27.

In order to simultaneously generate the timing pulse from CPU 24 and timing pulse from the clock counter 26, the switching signal generation circuit 27 generates, based on the comparison signal, a switching signal for switching those outputs of a plurality of different bargaining frequency crystal oscillators in the clock generation circuit 22 or their frequency division ratio and delivers it to the clock generation circuit 22 so that the adapter reference clock CK-a output from the clock generation circuit 22 has its frequency controlled.

According to the aforementioned other embodiment, even if the reference clock CK-d on the CD-ROM drive $15_1$ has its frequency shifted, there occurs a corresponding variation in frequency of the adapter reference clock CK-a on the host PC 13 side. It is, therefore, possible to prevent the buffer RAM 18 from being placed in an over- or an underflowed state, thus ensuring a normal data reproduction.

Further, since a data block readout request signal output from the CD-ROM drive $15_1$ is utilized for the detection of one block period, it is not necessary to provide any dedicated synchronizing signal line so as to secure synchronization between the adapter reference clock CK-a on the host PC 13 side and the reference clock CK-d on the CD-ROM drive $15_1$ side. Thus that arrangement is advantageous.

The present invention is not restricted to the aforementioned respective embodiments and various changes of the present invention can be made without departing from the essence of the present invention.

INDUSTRIAL APPLICABILITY

According to the present invention, as set out in more detail above, a much better digital data processing apparatus can be provided which, even when the occurs a shift in frequency of a clock serving as the reference of a data processing speed relative to a host processing section side and date reproduction section side, can prevent a buffer memory from being placed in an over- or an underflowed state and make a normal data reproduction.

We claim:

1. A digital data processing apparatus comprising:
a reproduction section for reproducing and outputting based on a first clock signal generated by a first clock generation circuit, digital data which is stored on a recording medium, wherein the first clock generating circuit has a first oscillator means;
a host processing section for performing predetermined processing, the host processing section having a memory for storing the digital data that is outputted by the reproduction section and for outputting the digital data stored in the memory in accordance with a second clock signal generated by a second clock generating circuit, wherein the second clock generating circuit has a second oscillator means and the second oscillator means is physically different from the first oscillator means; and
control means for detecting a shift in a frequency of the first clock signal based on a specific timing reference component contained in the digital data that is outputted by the reproduction section and for varying a frequency of the second clock signal in accordance with the detected shift in the frequency of the first clock signal.

2. A digital data processing apparatus according to claim 1, wherein the control means varies the frequency of the second clock signal in accordance with the detected shift in the frequency of the first clock signal so that a speed of the digital data outputted from the memory is the same as a speed in which the digital data is stored in the memory.

3. A digital data processing apparatus according to claim 1, wherein:
the digital data is divided into blocks; and
the control means includes:
detecting means for detecting a specific signal component of each block;
counting means for counting the second clock signal and for generating a timing signal that has a cycle that corresponds to the blocks;
comparing means for comparing the timing signal and the detected specific signal components; and
adjusting means, responsive to the comparison made by the comparing means, for varying the frequency of the second clock signal.

4. A digital data processing apparatus according to claim 3, wherein the detected specific signal component of each block includes a synchronizing signal.

5. A digital data processing apparatus according to claim 3, wherein the detected specific signal component of each block includes a signal that corresponds to a head position of the block.

6. A digital data processing apparatus comprising:
a reproduction section for reproducing and outputting, based on a first clock signal generated by a first clock generation circuit, digital data which is stored on a recording medium, wherein the digital data is divided into blocks;
a host processing section for performing predetermined processing, the host processing section having a memory for storing the digital data that is outputted by the reproduction section and for outputting the digital data stored in the memory in accordance with a second clock signal generated by a second clock generating circuit; and
control means for detecting a shift in a frequency of the first clock signal in accordance with the digital data that is outputted by the reproduction section and for varying a frequency of the second clock signal in accordance with the detected shift in the frequency of the first clock signal, wherein the control means includes:
detecting means for detecting a specific signal component of each block;
counting means for counting the second clock signal and for generating a timing signal that has a cycle that corresponds to the blocks;
comparing means for comparing the timing signal and the detected specific signal components; and adjusting means, responsive to the comparison made by the comparing means, for varying the frequency of the second clock signal.

7. A digital data processing apparatus according to claim 6, wherein the detected specific signal component of each block includes a synchronizing signal.

8. A digital data processing apparatus according to claim 6, wherein the detected specific signal component of each block includes a signal that corresponds to a head position of the block.

9. A digital data processing apparatus for processing digital audio data comprising:

a reproduction section including:
  a first clock generation circuit, including a first crystal oscillator, for generating a first clock signal; and
  reproducing means for reproducing and outputting, based on the first clock signal, the digital audio data which is stored on a disc type recording medium;

a host processing section for performing predetermined processing, the host processing section including:
  a second clock generating circuit, including a second crystal oscillator, for generating a second clock signal, wherein the second crystal oscillator is physically different from the first crystal oscillator; and
  a memory for storing the digital audio data that is outputted by the reproducing means and for outputting the digital audio data stored in the memory in accordance with the second clock signal; and control means for detecting, based on a specific timing reference component contained in the digital audio data that is outputted by the reproducing means, a shift in a frequency of the first clock signal, and for varying, in accordance with the detected shift in the frequency of the first clock signal, a frequency of the second clock signal.

10. A digital data processing apparatus comprising:

a reproduction section for reproducing and outputting, based on a first clock signal generated by a first clock generation circuit, digital data which is divided into blocks and which is stored on a recording medium, wherein the first clock generating circuit has a first oscillator means;

a host processing section for performing predetermined processing, the host processing section having a memory for storing the digital data that is outputted by the reproduction section and for outputting the digital data stored in the memory in accordance with a second clock signal generated by a second clock generating circuit, wherein the second clock generating circuit has a second oscillator means and the second oscillator means is physically different from the first oscillator means; and control means for detecting a shift in a frequency of the first clock signal in accordance with the digital data that is outputted by the reproduction section and for varying a frequency of the second clock signal in accordance with the detected shift in the frequency of the first clock signal, the control means including:
  detecting means for detecting a specific signal component of each block;
  counting means for counting the second clock signal and for generating a timing signal that has a cycle that corresponds to the blocks;
  comparing means for comparing the timing signal and the detected specific signal components; and
  adjusting means, responsive to the comparison made by the comparing means, for varying the frequency of the second clock signal.

11. A digital data processing apparatus according to claim 10, wherein the detected specific signal component of each block includes a synchronizing signal.

12. A digital data processing apparatus according to claim 10, wherein the detected specific signal component of each block includes a signal that corresponds to a head position of the block.

* * * * *